US011248906B2

(12) United States Patent
Cenac

(10) Patent No.: US 11,248,906 B2
(45) Date of Patent: Feb. 15, 2022

(54) METHOD AND SYSTEM FOR INSPECTING PLY-BY-PLY MACHINING OF MULTILAYER MATERIALS

(71) Applicant: BAYAB INDUSTRIES, Montrabe (FR)

(72) Inventor: Francois Cenac, Lanta (FR)

(73) Assignee: Bayab Industries, Montrabe (FR)

( * ) Notice: Subject to any disclaimer, the term of this patent is extended or adjusted under 35 U.S.C. 154(b) by 225 days.

(21) Appl. No.: 16/461,003

(22) PCT Filed: Nov. 14, 2017

(86) PCT No.: PCT/EP2017/079177
§ 371 (c)(1),
(2) Date: May 15, 2019

(87) PCT Pub. No.: WO2018/091454
PCT Pub. Date: May 24, 2018

(65) Prior Publication Data
US 2019/0310081 A1    Oct. 10, 2019

(30) Foreign Application Priority Data
Nov. 15, 2016  (FR) ........................ 1661031

(51) Int. Cl.
*G01B 11/30* (2006.01)
*B23Q 17/24* (2006.01)
(Continued)

(52) U.S. Cl.
CPC ........ *G01B 11/303* (2013.01); *B23Q 17/2471* (2013.01); *G01M 5/0091* (2013.01); *B29C 73/12* (2013.01); *B32B 38/10* (2013.01)

(58) Field of Classification Search
CPC ..... G01B 11/303; G01B 11/306; G01B 11/24; G01B 11/2513; G06T 7/586; G06T 7/529;
(Continued)

(56) References Cited

U.S. PATENT DOCUMENTS 6,871,684 B2 * 3/2005 Engelbart ............. G01N 21/88
156/361
9,618,459 B2 * 4/2017 Maass ............. G05B 19/41875
(Continued)

FOREIGN PATENT DOCUMENTS

WO    WO2013156124    10/2013

*Primary Examiner* — Rebecca C Bryant
(74) *Attorney, Agent, or Firm* — Defillo & Associates, Inc; Evelyn A Defillo

(57) ABSTRACT

The invention relates to achieve a rapid, reproducible and reliable characterization of the quality of ply-by-ply machining of multilayer materials. This method for inspecting ply-by-ply machining of a part (10) made of multilayer composite material under repair by machining a ply-by-ply staggered or continuously sloped cut out in a stack of plies of various successive orientations includes taking images (IA to ID), under lighting of different orientations (12), of a surface area (10a) of the machined part (10) to be inspected; performing an analysis by comparing the images (IA to ID) pixel by pixel (P0) in order to define the orientation of each pixel (P0) as corresponding to that of the image in which this pixel has a higher brightness; if the pixel has a similar brightness in all the images (IA à ID), this pixel (Pr) is attributed to a resin; constructing a map (5) in units of ply of the surface area to be inspected (10a) by applying the preceding analysis to all of the pixels; estimating a machining quality level from the map (5) produced, and archiving (2m) each map (5) thus produced as a machining result.

9 Claims, 3 Drawing Sheets

(51) Int. Cl.
*G01M 5/00* (2006.01)
*B29C 73/12* (2006.01)
*B32B 38/10* (2006.01)

(58) Field of Classification Search
CPC ............ G06T 7/514; G01N 2021/4711; G05B 2219/37217–37206
See application file for complete search history.

(56) References Cited

U.S. PATENT DOCUMENTS

| | | |
|---|---|---|
| 10,343,352 B2 * | 7/2019 | Iwata ..................... G01N 21/84 |
| 2013/0164481 A1 | 6/2013 | Whitworth |
| 2013/0294644 A1 | 11/2013 | Cork |
| 2015/0185128 A1 | 7/2015 | Chang et al. |
| 2015/0203217 A1 | 7/2015 | Urban |

* cited by examiner

METHOD AND SYSTEM FOR INSPECTING PLY-BY-PLY MACHINING OF MULTILAYER MATERIALS

CROSS REFERENCE TO RELATED APPLICATION

This application is a national stage entry of PCT/EP2017/079177 filed Nov. 14, 2017, under the International Convention and claiming priority over French application No. FR1661031 filed Nov. 15, 2016.

TECHNICAL FIELD

The invention relates to a method for inspecting ply-by-ply machining of multilayer materials, in particular composite materials. The context of the invention is the use of any appropriate machining technology to remove particular volumes of material, in particular by means of a high-pressure abrasive water jet. The invention also relates to an automated ply-by-ply machining inspection system adapted to employ this kind of method.

The invention applies to mechanical structures of large size in the fields of wind power, aeronautics and shipbuilding and in particular but not exclusively to box section panels, frame panels and wall panels. Nowadays, these structures are increasingly constituted of long fiber materials, generally composite materials as the latter materials enable a mechanical strength to weight ratio to be achieved of a significantly higher level than the ratios achieved with the classic materials based on metal alloys.

Generally speaking, composite materials are constituted of a stack of layers or plies of fibers carbon fibers, glass fibers, kevlar fibers and so on oriented in different directions from one ply to the next. The plies are impregnated with resin in order to form an assembly having great strength in the direction of the fibers.

Moreover, the varying orientation of the successive layers of plies and the small thickness of those plies enable adaptation and therefore optimization of the structures as a function of local constraints. Composite materials therefore enable production of large structures in one piece.

PRIOR ART

However, the high fabrication cost of composite materials imposes repairing them in the event of an impact or a defect.

In aeronautics in particular, two main methods have been developed for the repair of composite structures: bolted repair and glued repair. Bolted repair, already used for metal structures, is less suited to the specific characteristics of composite materials. In fact, this technique has the major disadvantage of necessitating a large number of holes to be drilled for rivets, and those holes are incompatible with the mechanical characteristics of long fiber composite materials.

Repair by gluing constitutes a more sophisticated technique well suited to composite materials. This kind of repair has been the subject of research and development, as illustrated for example by the patent documents EP 2 442 941, US 2015185128, US 2013164481, US 2013294644 and US20150203217. As shown by the sectional view of a composite material panel 10 in FIG. 1a, this kind of repair generally consists in removing the damaged material 9 (in dashed line in FIG. 1a) and machining a cut-out "E" consisting of successive ply-by-ply "Pi" steps Mi (or a continuous slope), the plies having three orientations in this example (shown by cross hatching in different directions).

The cut-out "E", produced with the aid of an energy input system—for example an abrasive water jet—widens from an unmachined bottom ply Px to a surface coating 1e of the panel 10.

A filler patch 20 the same shape as the cut-out "E" is then prepared and stuck to the steps Mi (or the slopes) of the plies of the panel 10 (cf. FIG. 1b) using epoxy resin or by co-curing. This patch 20 advantageously has plies P'i successively oriented like those of the panel 1 to be repaired and, once the projections Ai of the patch have been stuck to the steps Mi, the orientation of the plies is offset so that each ply P'i of the patch 20 bears on the ply Pi of the panel 10 that has the same orientation.

This kind of assembly conforms to the basic mechanical principle of glued repair: on each step of the structure the tension forces of the underlying ply Pi are transferred to the ply P'i with the same orientation that it supports through shear at the gluing level. The width of each step Mi is therefore determined to withstand the tension stresses in shear that each ply Pi of the structure has to withstand.

However, the repair machining must enable each ply concerned to be seen during the operation so that the transfer of the stresses in shear can be effected correctly, without attacking or spoiling the plies, in order not to reduce their mechanical strength in tension.

The machining and gluing precision required generates great variability of execution, which variability is the result of the singular features of the materials such as relaxation, reworking the plies (offsets, . . . ), the varying thickness of the plies (internal defects), or the presence of different materials. Now, no reliable non-destructive inspection means have been developed so far to validate the correct execution of the machining and gluing phases and so glued repair of structural parts is not certified in aeronautics.

It has thus appeared useful to reduce the variabilities of the various phases of glued repair by automating the machining—by abrasive water jet, laser, cutting tool or ultrasound—and to define qualitative indicators enabling certain phases to be validated.

However, the geometrical variabilities of the parts to be repaired resulting from the singular features referred to above rule out the definition of geometrical quality criteria and thus only visual, non-automated criteria are used: each step is observed and the percentage of the step at the surface having the correct orientation of the fibers is indicated. This approach is lengthy, laborious and relatively unreproducible and the archiving of the results is unreliable.

These kinds of visual and manual inspection methods continue to be random and in the final analysis measurement variability remains worse than that of the phenomenon to be inspected.

SUMMARY OF THE INVENTION

The invention aims to produce a characterization of the ply-by-ply machining quality of multilayer materials having much greater rapidity, reproducibility and archiving reliability than those of manual visual inspection methods. To this end, the invention provides optical characterization by image analysis for inspecting the surface state of a part after repair machining.

To this end, the present invention consists in a method for inspecting ply-by-ply machining of a part under repair made of a fiber-resin type multilayer composite material by ply-by-ply machining a stepped or continuously sloped cut-out in a stack of plies with different successive orientations, including the following steps:

capturing images with lighting of different orientation of a surface of the machined part to be inspected as a function of the orientations and the optical characteristics of the machined plies;

analyzing by comparing the images pixel by pixel in order to determine the orientation of each pixel as corresponding to that of the image in which that pixel has a greater brightness;

if the pixel has similar brightness in all the images that pixel is attributed to the resin;

constructing a map expressed in ply units of the surface to be inspected by applying the foregoing analysis to all the pixels;

estimating a level of machining quality from the map produced; and archiving each map produced in this way as a machining result.

According to advantageous embodiments:

an additional step, before archiving, determines zone by zone, in particular step by step, the surface distribution of the ply and resin orientation phases in order to validate a predetermined machining tolerance expressed in ply units;

the additional step is followed by a complementary step of determining the machined depth expressed in ply units from said surface distribution;

the machined depth expressed in ply units is determined for each phase by a graphical rendition of its surface distribution as a function of different depths expressed in ply units.

The invention also relates to an automated system for ply-by-ply repair machining inspection of a surface of a multilayer material part adapted to employ this kind of method. This system includes a digital data processing unit connected to a controller of light sources and a controller of at least one imaging video camera. The sources are distributed in linear lighting strips mounted on adjacent light walls successively oriented to form a regular polyhedron coinciding with ply orientations and closed around a central axis, the video camera being disposed on that central axis.

The video camera records image brightness signals corresponding to lighting the part to be inspected by oppositely oriented pairs of strips of light sources successively activated by the controller. A converter of the image signals is adapted to transmit image brightness digital data corresponding to the different ply orientations to the digital processing unit to supply brightness information exploited by the method defined above.

According to preferred embodiments:

the video camera and the light sources are fixed to an XY mobile table controlled by the processing unit to position the video camera and the lighting strips in order to produce an assembly of elementary images recorded by the video camera on lighting oppositely oriented pairs of lighting strips activated successively by the controller;

the digital processing unit includes a memory module for archiving the brightness data, pixel orientation data, map data and the estimated level of machining quality obtained by processing image signal data using the method according to the invention;

the memory module of the digital processing unit also includes machining tolerance data predetermined as a function of the material and the mechanical characteristics of the part;

the spectral band of the light sources, the orientations of the walls and therefore of the lighting by the strips of light sources and the optical characteristics of the video camera, in particular characteristics of filtering by a polarized filter, are adapted to the machined multilayer material;

the polyhedron of the light walls is an octagon and the light sources are light-emitting diodes aligned along each face of that octagon.

DESCRIPTION OF THE FIGURES

Other data, features and advantages of the present invention will become apparent on reading the following nonlimiting description with reference to the appended figures, in which.

DETAILED DESCRIPTION OF EMBODIMENTS

Figure 2:
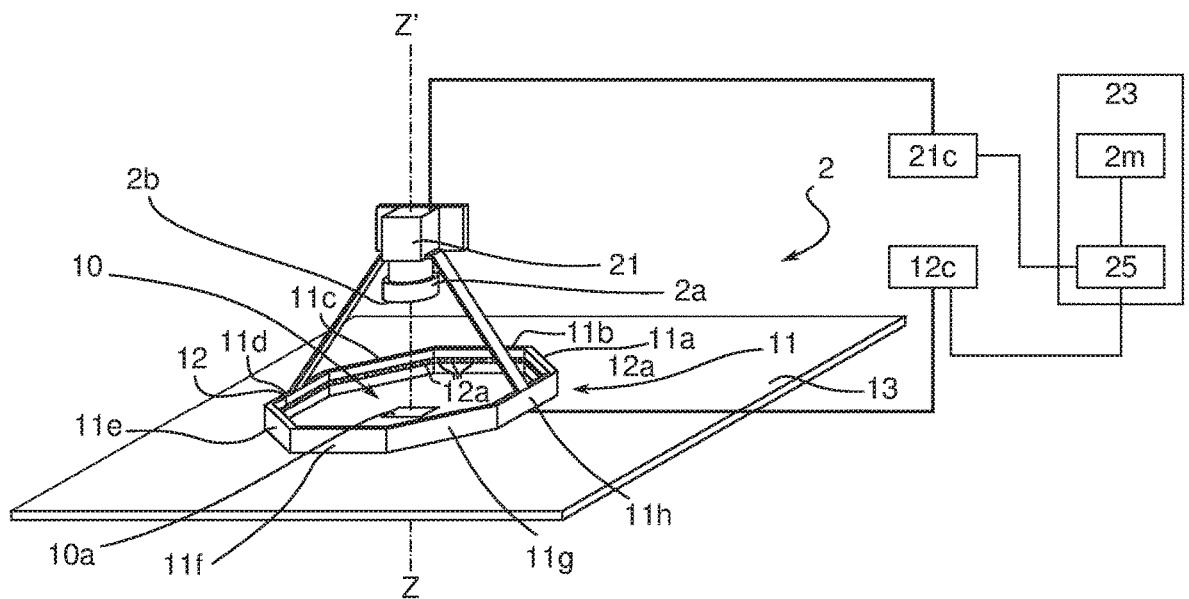
FIG. 2 shows a top view of an example of an inspection system according to the invention with light walls forming an octagon around the imaging video camera.

Referring to the FIG. 2 top view, an automated repair machining inspection system 2 according to the invention includes eight light walls 11a to 11 h forming a regular octagon 11 with central axis Z'Z. Each pair of adjacent walls, for example walls 11a and 11b, has an angular offset of 45° and two walls symmetrically opposite with respect to the axis Z'Z, for example walls 11a and 11e, are parallel.

Each wall 11a to 11h integrates a linear strip of light sources 12, six light-emitting diodes "LED" 12a in the example shown. The lighting by each light strip 12 has for its angle that of the wall 11a to 11 h on which the lighting strip is fixed and the strip pairs of two opposite walls, and thus of opposite orientation, are electrically interconnected.

Taking as reference a plane II-II perpendicular to two opposite walls, the walls 11a and 11e in the example, the lighting by the strips 12 fixed to two opposite walls 11a and 11e, 11 b and 11f, 11c and 11 g as well as 11d and 11 h is oriented with angle differences respectively equal to 0°, 45°, 90° and 135° on the composite material panel 10 to be inspected, e.g. disposed parallel to the plane of the lighting strips 12. The lighting strips 12 are advantageously fixed to an XY mobile table 13.

The automated system 2 also includes a digital imaging video camera 21, also fixed to the XY mobile table 13, including a lens 2a matched to the spectral band of the LEDs 12a. The lens 2a, aligned on the central axis Z'Z, is advantageously fitted with a polarizing filter 2b in order to generate reflection-free images of the surface 10a of the panel 10 machined for glued repair. More generally, it is advantageous to adapt the lens, the addition of filters, the type of photosensitive cells of the video cameras as a function of the materials inspected.

Moreover, account is advantageously taken of the main orientations of the layers of the multilayer material to be inspected in order to define the optical characteristics of the video camera and the number of lighting strips so as to use pertinent angle differences between the strips in order to cover all of the repair zone.

Moreover, the automated system 2 includes a digital data processing unit 23 with an integral memory module 2m connected to a controller 12c of the lighting strips 12 and a controller 21c of the imaging video camera 21. A signal converter 25 also integrated into the processing unit 23 converts the image signals into digital data that can be exploited by the processing unit 23.

In operation, lighting by the opposite strips 12 is successively activated by the controller 12c and the video camera 21 records an image for each orientation of the lighting strips 12, the digital processing unit 23 managing all of the controllers.

Figure 3:
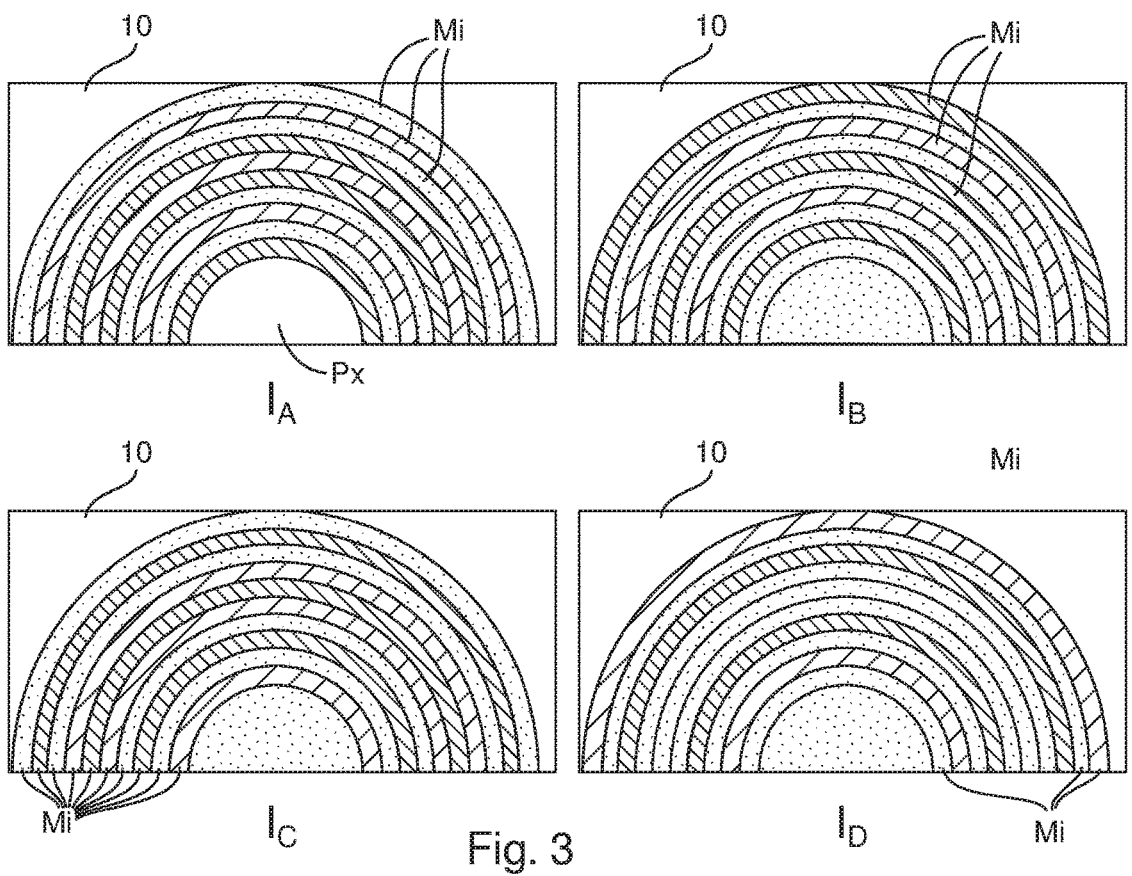
FIG. 3 shows four views of images ($I_A$ to $I_D$) captured by the video camera from FIG. 2 with four respective lighting orientations produced successively by the light walls from FIG. 2.

Referring to the four image views $I_A$ to $I_D$ in FIG. 3 obtained in this way, the zone covered by the video camera 21 and the lighting strips 12 is advantageously positioned in the plane XY by the table 13 (cf. FIG. 2) to enable a complete or at least representative inspection of all of the machining. The four images $I_A$ to $I_D$ obtained for the four lighting orientations 0°, 45°, 90° and 135°, coinciding with the orientations of the plies, extend over a wide area 300×130 mm². To be more precise, the XY mobile table 13 is controlled by the digital processing unit 23 to enable assembly of elementary images that individually extend over approximately 15×15 mm². The converter 25 of the image signals recorded by the video camera 21 transmits digital data to the digital processing unit 23 to supply the image information exploited below (cf. FIG. 2).

Figure 1A:
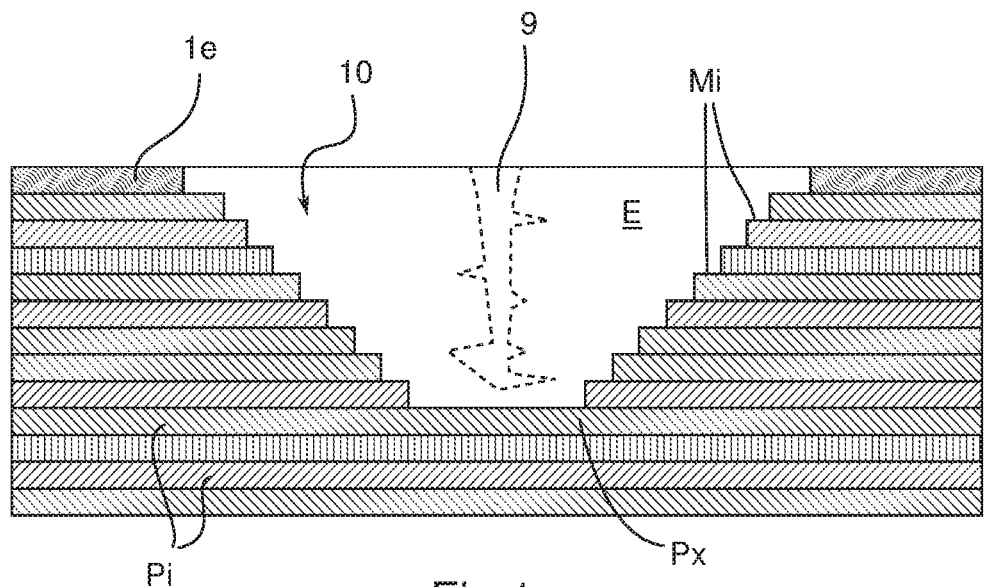
FIGS. 1a and 1b (already commented on) are sectional views of a multilayer panel machined for a local repair (FIG. 1a) and plugged by a patch (FIG. 1b) using the known glued repair technique.
Figure 1B:
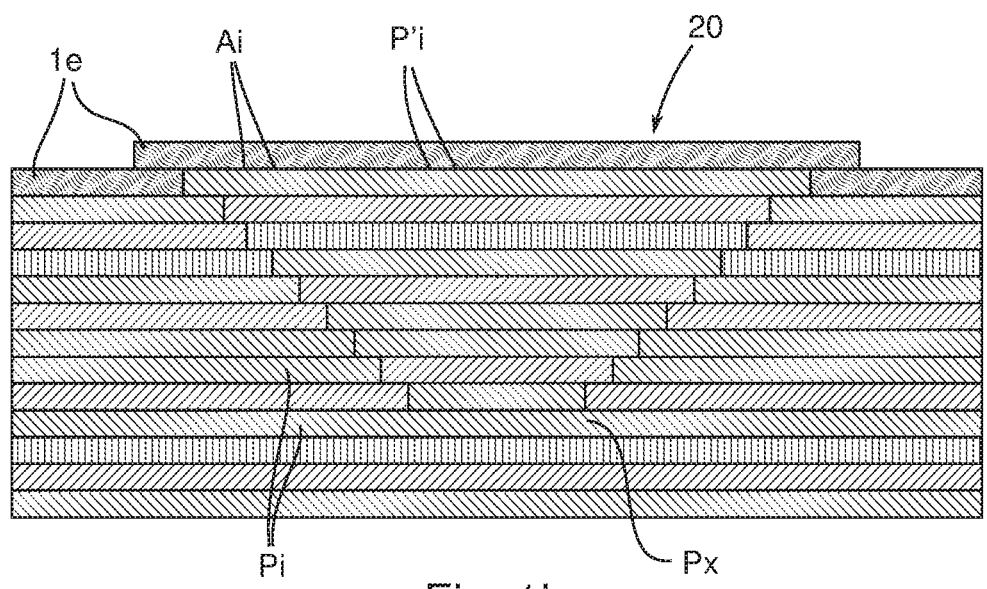

The images $I_A$ to $I_D$ show different semicircular steps Mi around the bottom ply Px, the steps Mi being obtained after ply-by-ply machining for subsequent repair of the machined composite material panel 10 by means of a patch with a complementary configuration (cf. FIGS. 1a and 1b). The brightness of the steps Mi differs according to the orientation of the lighting strips. These brightness differences are exploited by the generation of a surface map for estimating the level of machining quality (see below).

Figure 4:
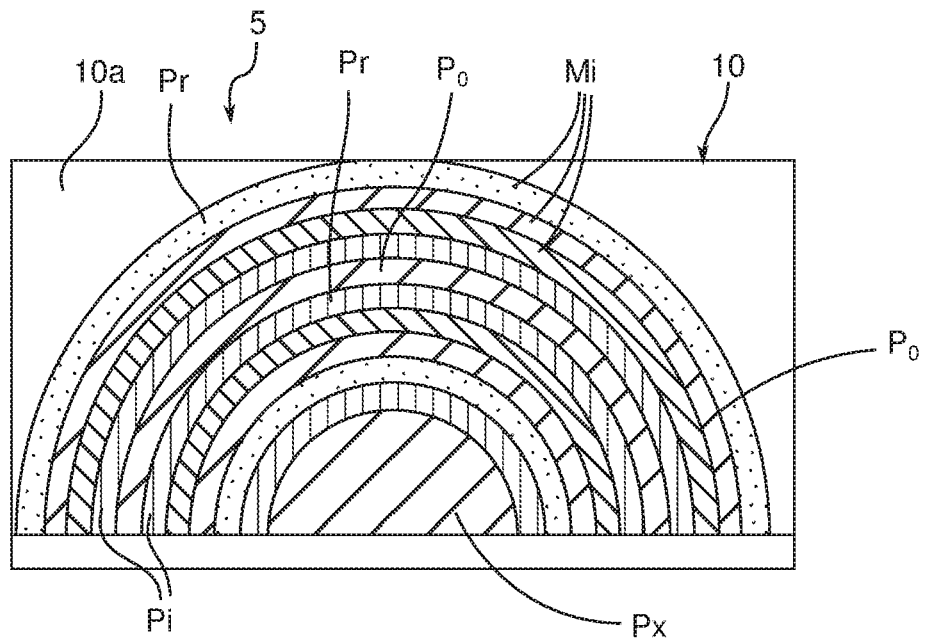
FIG. 4 shows a map of the machined surface obtained by selection of the orientation of each pixel based on a comparison of the brightness values of that pixel in the images from FIG. 3.

This kind of surface map 5 of the machined panel 10 to be inspected is shown in FIG. 4. This map 5 is produced by analyzing the four images $I_A$ to $I_D$ from FIG. 3. The analysis consists in pixel by pixel comparison of the four images $I_A$ to $I_D$ of the machined surface 10a calibrated in terms of ply units in the following manner. To be more precise, if the brightness of a pixel $P_0$ of one image, for example the image $I_A$, is greater than that of the same pixel in the other images $I_B$ to $I_D$, the pixel $P_0$ is considered to have the orientation of the image $I_A$. If a pixel Pr has similar levels of brightness in the four images $I_A$ to $I_D$, that pixel Pr is considered to be from the resin.

This surface map 5 then enables direct, automated, rapid and reproducible estimation by the processing unit 23 of the quality of machining as a function of the homogeneity of the assignment of pixels to the various images $I_A$ to $I_D$ corresponding to the various ply orientations. This direct estimate is digitally archived in the memory module 2m of the processing unit 23.

The surface percentages of the five phases the four ply and resin orientations of the surface map 5 may advantageously also be exploited by the processing unit 23 per zone, in the example per step Mi, and define a percentage of each ply orientation for a reference orientation, a 45° orientation in the example: 85% of plies at 45°, 8% of resin and 7% of plies at 90°. These percentages are then used to validate the machining tolerance expressed in ply units for this panel 10, as referenced in the memory module 2m of the processing unit 23 (cf. FIG. 2). The map is also archived in this module 2m.

Figure 5:
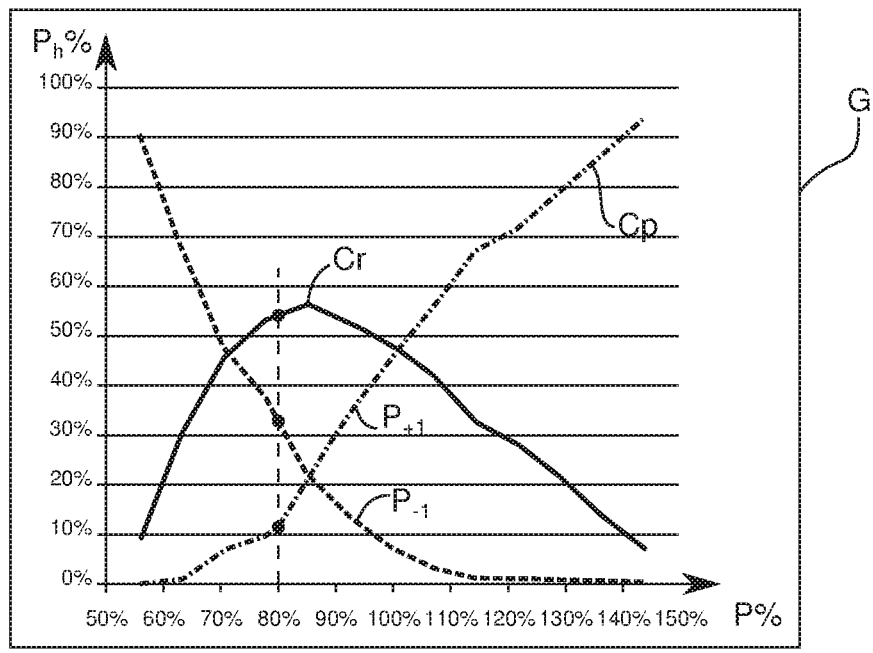
FIG. 5 shows a graph of the evolution of the inspected surface percentage of different ply and resin orientation phases for different depths expressed in ply units.

The surface percentages of the five phases of the map 5 also make it possible to define machined depths expressed in ply units, as the graph "G" in FIG. 5 shows.

This graph "G" shows the evolution of the surface percentage curve $C_P$ of controlled phase Ph % on two consecutive plies P+1 and P−1 for different depths P % expressed in ply units situated around the interply interface taken as a 100% reference. The "resin" phase percentage curve Cr is also shown.

Each depth P % expressed in ply units, for example 80% on the FIG. 5 graph, corresponds to specific distributions substantially complementary to the inspected surface Ph % in the plies P+1 and P−1, respectively approximately 10% and 35% in the example, with approximately 55% resin. The graph "G" is also archived in the memory module 2m (cf. FIG. 2).

The invention is not limited to the examples described and shown. The method according to the invention may be totally, semi or partially automated. Also, the number of light walls may be 6, 10, 12 or more, and the number of light sources per strip may also vary. Moreover, two video cameras positioned face to face may be used. Additionally, the light walls need not be coupled in pairs.

The invention claimed is:

1. A method for inspecting a ply-by-ply machining of a part under repair made of a fiber-resin multilayer composite material by ply-by-ply machining a stepped or continuously sloped cut-out in a stack of plies with different successive orientations, the method comprising the steps of:
   capturing images, by illuminating from different orientations a surface of the part;
   transmitting the image to a digital processing unit;
   analyzing each one of the images by comparing a pixel by pixel to determine the image in which the pixel has a greater brightness;
   if the pixel has similar brightness in all the images, then, the pixel is attributed to the resin;
   constructing a map of the surface to be inspected by applying the analyzing step to all the pixels;
   estimating a level of machining quality from the map as a function of the brightness homogeneity of pixels on the images; and
   archiving each map produced in a memory on the digital processing unit.

2. The ply-by-ply machining inspection method according to claim 1, further comprising before the archiving step, the step of determining a zone by zone, the surface distribution of the pixels and a resin orientation to determine a predetermined machining tolerance.

3. The ply-by-ply machining inspection method according to claim 2, wherein the determining step is followed by a step of determining the machined depth.

4. The ply-by-ply machining inspection method according to claim 3, wherein the machined depth is determined by a graphical report of its surface distribution as a function of different depths.

5. An automated system for ply-by-ply repair machining inspection of a surface of a multilayer material part comprising:
   a digital data processing unit connected to a controller of light sources and
   a controller of at least one imaging video camera;

wherein the light sources are distributed on linear lighting strips mounted on adjacent light walls successively oriented to form a regular polyhedron;

wherein the video camera being disposed on a central axis and recording image brightness signals corresponding to the lighting of pairs of strips of light sources of opposite orientation on the part to be inspected and successively activated by the controller, and in that a converter of the image signals is adapted to transmit brightness digital data of images corresponding to the different ply orientations to the digital processing unit;

wherein the digital processing unit performs the analysis of brightness digital data according to the method of claim 1.

6. The automated machining inspection system according to claim 5, wherein the video camera and the light sources are fixed to an XY mobile table controlled by the processing unit to position the video camera and the lighting strips in order to produce an assembly of elementary images recorded by the video camera on lighting oppositely oriented pairs of lighting strips activated successively by the controller.

7. The automated machining inspection system as claimed in claim 5, wherein the digital processing unit includes a memory module for archiving the brightness data, pixel orientation data, map data, and an estimated level of machining quality obtained by processing image signal data.

8. The automated machining inspection system according to claim 7, wherein the memory module of the digital processing unit also includes machining tolerance data predetermined as a function of the material and the mechanical characteristics of the part.

9. The automated machining inspection system as claimed in claim 5, wherein the polyhedron of the light walls is an octagon and the light sources are light-emitting diodes aligned along each face of that octagon.

\* \* \* \* \*